United States Patent [19]

Krieg

[11] Patent Number: 4,470,103

[45] Date of Patent: Sep. 4, 1984

[54] COMBINED DIRECT-INDIRECT LIGHTING PHOTOGRAPHIC SCENE ILLUMINATION DEVICE

[75] Inventor: Rudolf Krieg, Munich, Fed. Rep. of Germany

[73] Assignee: Patent-Treuhand-Gesellschaft für Elektrische Glühlampen mbH, Munich, Fed. Rep. of Germany

[21] Appl. No.: 218,344

[22] Filed: Dec. 22, 1980

[30] Foreign Application Priority Data

Jan. 9, 1980 [DE] Fed. Rep. of Germany ....... 3000594

[51] Int. Cl.[3] .............................................. G03B 15/02

[52] U.S. Cl. ...................................... 362/17; 362/283; 362/297; 362/302; 362/346

[58] Field of Search ..................... 362/16, 17, 18, 263, 362/297, 301, 302, 282, 283, 322, 346, 347, 350

[56] References Cited

U.S. PATENT DOCUMENTS 2,113,777 4/1938 Waterbury ......................... 362/282
2,321,488 6/1943 Hughes .............................. 362/322
2,876,338 3/1959 Seligson ............................ 362/322
4,194,234 3/1980 Geissler ............................. 362/283
4,298,909 11/1981 Krily ................................. 362/283

*Primary Examiner*—Donald P. Walsh
*Attorney, Agent, or Firm*—Frishauf, Holtz, Goodman & Woodward

[57] ABSTRACT

To provide for combined direct and indirect illumination of scenes or objects to be photographed or recorded, a halogen incandescent lamp (1) is positioned in a reflector which has two reflector portions (5, 6) having relative light output of, for example, 1:6. The reflector portions are obtained by forming cut lines (9, 10) parallel to a plane passing through the apex of the reflector and the lamp axis (A), the relatively larger reflector portion (6) being pivotably mounted in the housing. Reflective flaps (11) preferably depend from the relatively larger reflector portion (6) to provide for reflective surfaces adjacent the relatively smaller reflector portion (5) when the relatively larger portion (6) is pivoted away from the lamp axis (FIG. 3- A). A disk (4) may be placed in front of the larger reflector portion (6).

15 Claims, 3 Drawing Figures

COMBINED DIRECT-INDIRECT LIGHTING PHOTOGRAPHIC SCENE ILLUMINATION DEVICE

The present invention relates to photographic scene illumination apparatus, and more particularly to photographic lighting apparatus using a halogen incandescent lamp which can provide scene flood or spot lighting.

BACKGROUND

Various types of photographic illumination devices are known which provide generally flood lighting. Such apparatus, both for motion picture or still photography, television scene illumination and the like, is usually provided to, selectively, provide direct or indirect illumination of the scenes or objects to be photographed or recorded. In operation, such light fixtures have light output directed in a predetermined direction. To transfer illumination from direct to indirect lighting, the light beam or path is changed from a direction towards the object of the scene to the ceiling of an enclosed space. Direct illumination of an object or a scene results in sharply defined harsh shadows; the result, when recorded or photographed, is a picture or image having only low spatial or depth aspect. Indirect illumination reduces shadows and the resulting image is soft, generally illuminated from all sides; highlights may be lost. In order to provide illumination which lights the general surroundings while still providing highlights and dramatic effects as desired by the photographer or producer, it has been customary to use two or more light fixtures, respectively providing direct and indirect illumination as desired. This requires multiple apparatus, multiple light sources, and hence additional cables and connections to power sources, which may be undesirable or unduly expensive.

THE INVENTION

It is an object to provide photographic illumination apparatus for a scene or an object which provides for flexible application of light with changeable direct and indirect illumination so that the interplay between light and shadow can be readily controlled by appropriate manipulation of a single fixture so that the artistic effect sought by the photographer can be obtained without a multiplicity of lighting equipment.

Briefly, a compact halogen incandescent lamp is located within a reflector which, in cross section, is essentially elliptical. In accordance with the invention, the reflector is a single structure which is split into multiple parts, preferably two parts or portions, which are movable with respect to each other and which, preferably, have largely unequal reflected light output. One portion, the smaller one, provides direct illumination along the axis of the elliptical reflector; a second portion, for example having a reflective surface about six times larger than the smaller one, is movable about an axis transverse to the plane which includes the axis of the lamp and of the reflector, when it forms a complete ellipse in cross section, so that light reflected thereby will be directed, for example, towards the ceiling of a room. By selective positioning of the angle of the larger reflective portion with respect to the fixed or smaller reflective portion, the degree of indirect lighting for the scene can be controlled, while still providing direct illumination from the fixture for highlighting and some shadow effects.

The light fixture has the advantage that it can provide, with one lamp bulb, direct and indirect illumination at the same time by suitably moving the second, and larger, reflector part or portion towards the ceiling of an enclosed space. The interplay of light and shadow can be controlled, based on the different degrees of intensity of light emitted from the respective portions of the reflector. Individual tastes and artistic effects can be controlled and selected by the photographer, so that the light-and-shadow proportion can be arranged to suit the taste and mood of the subject or of the photographer. It is possible to obtain illumination which provides images with the desired depth perception and soft frontal illumination without harsh shadows; yet, some shadow effect can be readily obtained, the degree of light-shadow interplay being individually controllable by adjustment of the reflector portions of the single illumination device.

DRAWINGS

Figure 1:
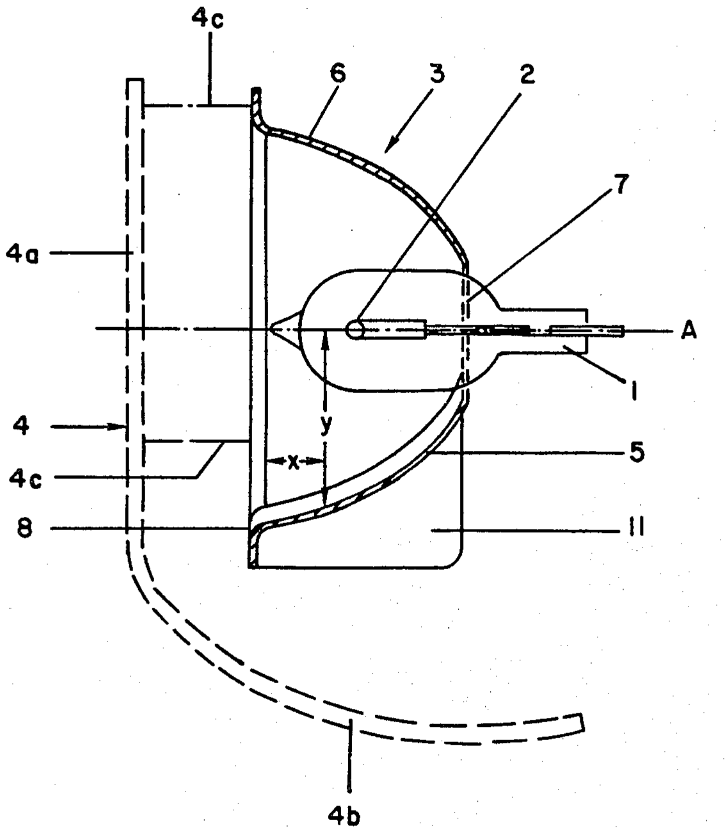
FIG. 1 is a highly schematic side view of the apparatus, omitting all parts not essential to an understanding of the invention, and elements such as housing handles, power supply cables, and the like, which are standard and can be arranged in any desirable, suitable and convenient manner.

The lamp fixture (FIG. 1) uses a halogen incandescent lamp 1 with a compact bulb in which a U-shaped compact filament 2 is located. The housing for the fixture is not illustrated. The axis of the lamp positioned in a reflector 3 is shown at A. The reflector and lamp combination and the housing thereof can be pivotably attached to a suitable holder or handle, a tripod connector, or the like, for placement and adjustment of the position. The reflector 3 is an essentially, elliptical and rotation-symmetrical structure. The reflective surface is patterned and has a curve which is defined by the equation $$E \equiv x^2 - 106.69x + 1.94y^2 - 3.88yk + 1.94k^2 = 0$$

wherein $1 \geqq k \geqq -1$.

Figure 2:
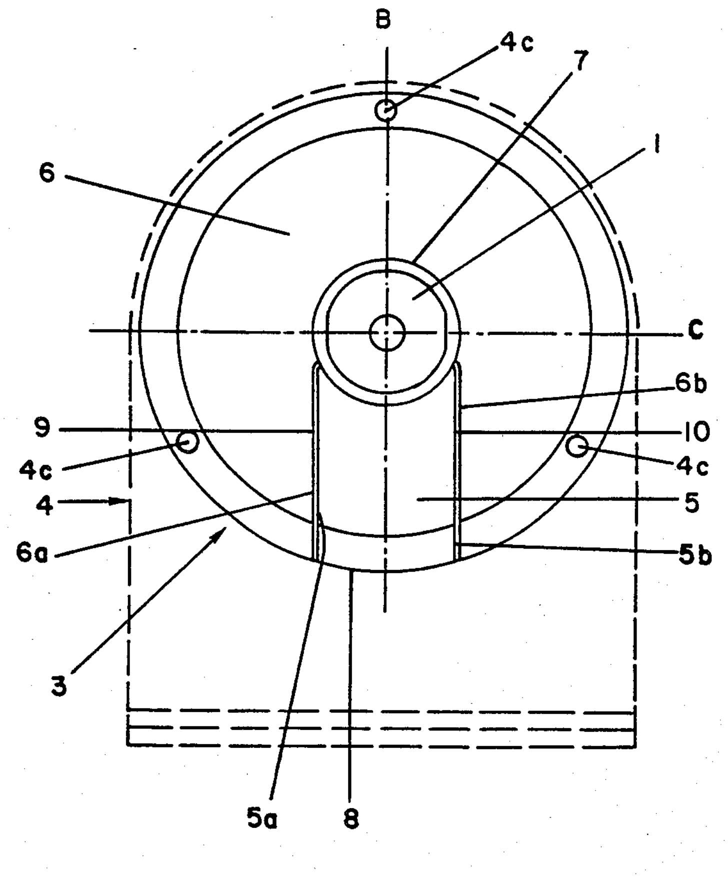
FIG. 2 is a front view of the illumination device.

The reflector structure 3 - see FIG. 2 - has two portions, one smaller portion 5 and a second, larger, portion 6. The ratio of the reflecting areas is such that the resulting light flux is divided in the approximate ratio of about 1:6. The relative ratios of the surface areas may be similar.

The reflector portion 5 is relatively fixed with respect to the halogen incandescant lamp 1. Looked at from the front - see FIG. 2 - the reflector portion 5 and the halogen lamp 1 are symmetrically positioned in a plane B, which includes the axis A of the lamp and of the reflector. The reflector portion 5 extends from the lamp opening 7 in the back of the reflector, that is, close to the apex thereof, to the lower edge 8 of the open portion of the reflector 3. The portion 5 is defined laterally by two parallel cut edges 5*a*, 5*b*.

The second reflector portion 6 is rotatable about axis C which extends perpendicularly to the plane B which includes the lamp axis A and the reflector axis and cuts the apex of the reflector 3.

Figure 3:
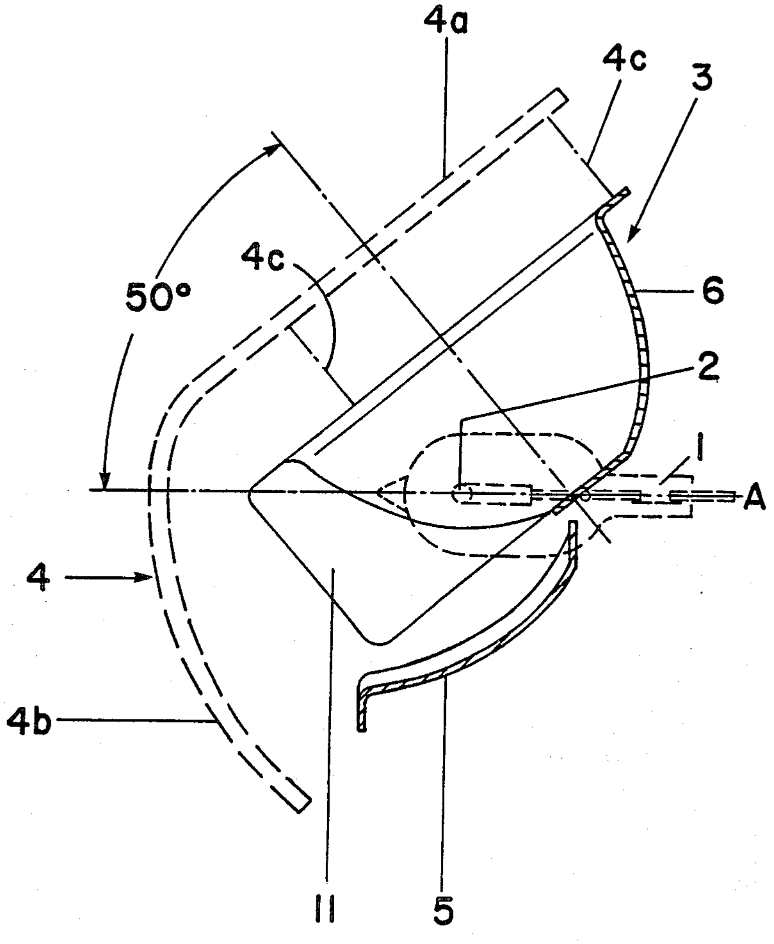
FIG. 3 is a side view, partly in section, of the device similar to FIG. 1, illustrating the reflector position for combined direct-indirect illumination.

Operation: For transportation and direct illumination, the reflector portion 6 is pivoted about the axis C such that the cut edges *5a, 5b* of the portion 5 and the adjacent cut edges *6a, 6b* of the portion 6 are next to each other. Light, thus, will be projected directed along the axis A and in planes prallel thereto - see FIG. 1. For part-indirect illumination, the portion 6 is pivoted upwardly about the axis C - see FIG. 3. In a preferred form, the reflector portion 6 has depending flaps 11 attached thereto which extend parallel to the cut edges *5a, 5b* of portion 5 to provide for laterally reflective surfaces adjacent the portion 5. The flaps 11 - see FIGS. 1, 3 - preferably are reflective in order to improve light distribution and light emanation from the fixed reflector portion and to provide for better lateral light delivery therefrom. The flaps 11 extend along the cut lines 9, 10 which separate the reflector portions 5,6. Preferably, they are integral with the reflector portion 6. When the reflector portion 6 is in the position shown in FIG. 1, the reflector axis and the lamp axis A will be congruent.

The pivot angle can be selected as desired; a suitable pivot angle is, for example, up to about 50°.

A protective, safety or light diffusing or scattering disk or element 4 can be secured to the refletor portion 6, spaced from the reflector 6 by, for example, about 2 cm. Preferably, the disk 4 has a plane portion *4a* and a bent portion *4b*, so that light reflected from both portions 5 and 6 will always pass through the disk. The composition of the disk can be as desired, depending on the use of the lamp, and whether safety, reduction of heat radiation and/or additional light modulation is desired. Preferably, the reflector surface is stippled or otherwise deformed so as not to be entirely smooth.

Tilting movement of the portion 6 can readily be obtained by journaling the lateral parts of the reflector portion 6 in suitable pivot points in the housing, coupled to an operating handle or grip, preferably with detents at suitable angular intervals, so that adjustable angular positions can be reproducibly obtained. The housing may be of any suitable shape. The disk 4 may be attached to the relatively larger reflector portion 6 by suitable struts or pins, schematically shown at *4c* in FIGS. 1 and 3. It has been omitted from FIG. 2, only the attachment struts being shown. Three struts, for example positioned about 120° and symmetrically with respect to the plane B, are suitable. The attachment elements *4c* can be integral with the rim 8 of the relatively larger reflector portion 6.

Various changes and modifications may be made within the scope of the inventive concept.

I claim:

1. Combined direct-indirect lighting photo scene illumination device having a halogen incandescent lamp (1) with a compact lamp filament (2) and a reflector (3), wherein the reflector (3) comprises a single reflector structure of essentially elliptical cross section and positioned symmetrically about the lamp, which structure includes two reflector portions (5, 6) which are movable with respect to each other and have a relative reflecting light flux ratio of about 1:6.

2. Device according to claim 1, wherein the relatively larger reflector portion (6) is pivotable about an axis (C) which extends at right angles to the plane (B) which includes the lamp axis (A) and the reflector axis;

the relatively smaller reflector portion (5) is fixed with respect to the lamp (1);

the relatively smaller reflector portion (5) is positioned symmetrically with respect to the plane (B) which is perpendicular to the pivot axis (C) of the larger reflector portion (6), and extends from the region of the lamp (1) adjacent the apex (7) thereof to light exit edge (8) of the reflector (3).

3. Device according to claim 2, wherein the relatively smaller reflector portion (5) is defined by two cut lines (9, 10) extending outwardly through the reflector structure and symmetrically from the apex fo the reflector to the rim (8) of the reflector with respect to said plane (B) including the lamp axis (A) and the reflector axis.

4. Device according to claim 3, wherein said cut lines (9, 10) extend parallel to said plane (B) including the lamp axis (A) and the reflector axis.

5. Device according to claim 2, further including reflecting flaps (11) secured to the relatively larger reflector portion (6) and extending in parallel to the cut lines (9, 10) defining the relatively smaller reflector portion (5).

6. Device according to claim 1, wherein the essentially elliptical reflector (3) is shaped approximately in accordance with the curve defined by:

$$E=x^2-106.69x+1.94y^2-3.88yk+1.94k^2=0$$

wherein $1 \geqq k \geqq -1$.

7. Device according to claim 1, wherein the halogen incandescent lamp (1) has a U-shaped incandescent filament.

8. Device according to claim 1, further including a disk (4) positioned in front of the reflector and spaced therefrom, and connected to the relatively larger reflector portion (6) to be movable therewith.

9. Device according to claim 8, wherein said disk (4) comprises a plane portion (*4a*) of at least essentially the same size as the light exit opening of said reflector (3) and a curved portion (*4b*) extending at least approximately from the light exit opening of the relatively smaller reflector portion (5) and over to said plane portion when the relatively larger reflector portion (6) is moved to its limit position with respect to the relatively smaller portion (5).

10. Device according to claim 8, wherein said disk (4) comprises protective, safety, light-diffusing or scattering disk elements.

11. Device according to claim 2, further including a protective, safety, light-diffusing or scattering disk (4) positioned in front of the reflector and spaced therefrom, and connected to the relatively larger reflector portion (6) to be movable therewith, and including a plane portion (*4a*) of approximately the same size as the light exit opening of said reflector (3), and a curved portion (*4b*) extending at least approximately from the light exit opening of the relatively smaller reflector portion (5) and over to said plane portion when the relatively larger reflector portion (6) is moved to its limit position with respect to the relatively smaller portion (5).

12. Device according to claim 3, further including a protective, safety, light-diffusing or scattering disk (4) positioned in front of the reflector and spaced therefrom, and connected to the relatively larger reflector portion (6) to be movable therewith, and including a plane portion (*4a*) of approximately the same size as the light exit opening of said reflector (3), and a curved portion (*4b*) extending at least approximately from the light exit opening of the relatively smaller reflector portion (5) and over to said plane portion when the relatively larger reflector portion (6) is moved to its limit position with respect to the relatively smaller portion (5).

13. Device according to claim 4, further including a protective, safety, light-diffusing or scattering disk (4) positioned in front of the reflector and spaced therefrom, and connected to the relatively larger reflector portion (6) to be movable therewith, and including a plane portion (4*a*) of approximately the same size as the light exit opening of said reflector (3), and a curved portion (4*b*) extending at least approximately from the light exit opening of the relatively smaller reflector portion (5) and over to said plane portion when the relatively larger reflector portion (6) is moved to its limit position with respect to the relatively smaller portion (5).

14. Device according to claim 5, further including a protective, safety, light-diffusing or scattering disk (4) positioned in front of the reflector and spaced therefrom, and connected to the relatively larger reflector portion (6) to be movable therewith, and including a plane portion (4*a*) of approximately the same size as the light exit opening of said reflector (3), and a curved portion (4*b*) extending at least approximately from the light exit opening of the relatively smaller reflector portion (5) and over to said plane portion when the relatively larger reflector portion (6) is moved to its limit position with respect to the relatively smaller portion (5).

15. Device according to claim 12, further including reflecting flaps (11) secured to the relatively larger reflector portion (6) and extending in parallel to the cut lines (9, 10) defining the relatively smaller reflector portion (5).

* * * * *